United States Patent
Seo et al.

(10) Patent No.: US 12,345,643 B2
(45) Date of Patent: Jul. 1, 2025

(54) TWO-PHOTON MICROSCOPE

(71) Applicant: ELECTRONICS AND TELECOMMUNICATIONS RESEARCH INSTITUTE, Daejeon (KR)

(72) Inventors: Hong-Seok Seo, Daejeon (KR); Dong Hoon Song, Daejeon (KR); Chul Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 310 days.

(21) Appl. No.: 18/088,958

(22) Filed: Dec. 27, 2022

(65) Prior Publication Data

US 2023/0384226 A1 Nov. 30, 2023

(30) Foreign Application Priority Data

May 27, 2022 (KR) .................. 10-2022-0065261

(51) Int. Cl.
 *G01N 21/64* (2006.01)
(52) U.S. Cl.
 CPC . *G01N 21/6458* (2013.01); *G01N 2021/6463* (2013.01); *G01N 2021/6484* (2013.01); *G01N 2201/0612* (2013.01)
(58) Field of Classification Search
 None
 See application file for complete search history.

(56) References Cited

U.S. PATENT DOCUMENTS

2012/0097958 A1 4/2012 Song et al.
2015/0235816 A1 8/2015 Yun et al.
2020/0412081 A1\* 12/2020 Muendel ............... H01S 3/1118

FOREIGN PATENT DOCUMENTS

JP 2010078559 A \* 4/2010
KR 10-2015-0035035 A 4/2015

OTHER PUBLICATIONS

Ryosuke Kawakami et al., "Visualizing hippocampal neurons with in vivo two-photon microscopy using a 1030 nm picosecond pulse laser", Scientific Reports, 2013.
Farhad Akhoundi et al., "Single-Cavity Three-Color All-Fiber Femtosecond Laser", IEEE, Photonics Technology Letters, vol. 33, No. 2, Jan. 15, 2021.
Winfried Denk et al., "Two-Photon Laser Scanning Fluorescence Mircroscopy", Science, vol. 248, Apr. 6, 1990.

\* cited by examiner

Primary Examiner — Edwin C Gunberg
(74) Attorney, Agent, or Firm — LRK PATENT LAW FIRM

(57) ABSTRACT

Disclosed is a two-photon microscope. This microscope includes a first laser light source configured to generate first laser light, a second laser light source configured to generate second laser light having a longer wavelength than a wavelength of the first laser light, an objective lens configured to provide the first laser light and the second laser light to a sample, a sensor configured to detect first fluorescent light and second fluorescent light generated in the sample due to the first laser light and the second laser light, and first and second code controllers provided between the first and second laser light sources and the objective lens and configured to switch the first laser light and the second laser light respectively.

18 Claims, 5 Drawing Sheets

First Laser State: 1,0,0,1,0,1,1,0,0,1,1,0,1,0,0,1

Second Laser State: 0,1,1,0,1,0,0,1,0,1,1,0,1,0,0,1

Third Laser State: 1,1,0,0,1,1,0,0,0,0,1,1,0,0,1,1

TWO-PHOTON MICROSCOPE

CROSS-REFERENCE TO RELATED APPLICATION(S)

This U.S. non-provisional patent application claims priority under 35 U.S.C. § 119 of Korean Patent Application No. 10-2022-0065261, filed on May 27, 2022, the entire contents of which are hereby incorporated by reference.

BACKGROUND

1. Field of the Invention

The present disclosure herein relates to a two-photon microscope, and more particularly, to a two-photon microscope for detecting fluorescent light.

2. Description of Related Art

The recent development of industrial technology requires precision and high productivity in the fields in which laser beams are used, and, to meet such requirements, ultrashort laser beams are used in various fields. Ultrashort laser beams may be used as source light in a two-photon microscope. Two-photon microscopes are usefully used in the fields of biology and medicine. In particular, two-photon microscopes play an important role to identify unknown cells and molecular-level phenomena in the cells in the fields of biology, and are thus used as a tool for cellular-level clinical diagnosis.

SUMMARY

The present disclosure provides a two-photon microscope capable of reducing noise of fluorescent light.

Disclosed is a two-photon microscope. This microscope includes: a first laser light source configured to generate first laser light; a second laser light source connected to the first laser light source and configured to generate second laser light having a longer wavelength than a wavelength of the first laser light; an objective lens configured to provide the first laser light and the second laser light to a sample; a sensor configured to detect first fluorescent light and second fluorescent light generated in the sample due to the first laser light and the second laser light; and first and second code controllers provided between the first and second laser light sources and the objective lens and configured to switch the first laser light and the second laser light respectively using an orthogonal code method.

According to an example, the sensor may include a two-photon sensor.

The first laser light source may include: a first optical fiber; a semiconductor saturable absorber mirror connected to one side of the first optical fiber; a volume Bragg grating provided to another side of the first optical fiber; and a first pump light source connected to the first optical fiber between the volume Bragg grating and the semiconductor saturable absorber mirror and configured to provide first pump light in the first optical fiber. The first optical fiber is an optical fiber including a gain medium. The first laser light source is a femto-second pulse laser.

According to an example, the second laser light source may include: a second optical fiber branched from the first optical fiber; and a second pump light source configured to provide second pump light in the second optical fiber to generate the second laser light. The second optical fiber is an optical fiber including a gain medium. The second laser light source is a femto-second pulse laser According to an example, the second laser light source may further include: a first nonlinear optical fiber connected to the second optical fiber and configured to wavelength disperse the first laser light; and a first wavelength tunable filter configured to tune the wavelength of the first laser light.

According to an example, the two-photon microscope may further include a third laser light source connected to the first laser light source and configured to generate third laser light having a shorter wavelength than the wavelength of the first laser light.

According to an example, the third laser light source may include: a third optical fiber branched from the first optical fiber; and a third pump light source configured to provide third pump light in the third optical fiber to generate the third laser light. The third optical fiber is an optical fiber including a gain medium. The third laser light source is a femto-second pulse laser.

According to an example, the third laser light source may further include: a second nonlinear optical fiber connected to the third optical fiber and configured to wavelength disperse the first laser light; and a second wavelength tunable filter configured to tune the wavelength of the first laser light.

According to an example, the first nonlinear optical fiber may include a first core having a first diameter, and the second nonlinear optical fiber may include a second core having a second diameter smaller than the first diameter. The first nonlinear optical fiber may have a normal dispersion value near zero at a wavelength of a first light source, and the second nonlinear optical fiber may have an anormal dispersion value near zero at the wavelength of the first light source.

According to an example, the two-photon microscope may further include a filter provided between the sensor and the objective lens and configured to remove the first, second, and third laser light.

A two-photon microscope according to an example of the inventive concept includes: a first laser light source configured to generate first laser light using first pump light; a second laser light source configured to generate second laser light having a longer wavelength than a wavelength of the first laser light using second pump light having a longer wavelength than a wavelength of the first pump light; a third laser light source configured to generate third laser light having a shorter wavelength than the wavelength of the first laser light using third pump light having a shorter wavelength than the wavelength of the first pump light; an objective lens configured to provide the first to third laser light to a sample; a sensor configured to detect first to third fluorescent light generated in the sample due to the first to third laser light; a filter provided between the sensor and the objective lens and configured to remove the third to third laser light; and first to third code controllers provided between the first to third laser light sources and the objective lens and configured to switch the first to third laser light respectively using an orthogonal code method.

According to an example, the first laser light source may include: a first optical fiber; a semiconductor saturable absorber mirror provided to one side of the first optical fiber; a volume Bragg grating provided to another side of the first optical fiber; and a first pump light source connected to the first optical fiber between the volume Bragg grating and the semiconductor saturable absorber mirror and configured to provide the first pump light in the first optical fiber.

According to an example, the second laser light source may include: a second optical fiber branched from the first optical fiber; a second pump light source configured to provide the second pump light in the second optical fiber; and a first nonlinear optical fiber connected to the second optical fiber and configured to wavelength disperse the first laser light.

According to an example, the third laser light source may include: a third optical fiber branched from the first optical fiber; a third pump light source configured to provide the third pump light in the third optical fiber; and a second nonlinear optical fiber connected to the third optical fiber and configured to wavelength disperse the first laser light.

According to an example, the second laser light source may further include a first wavelength tunable filter provided between the first nonlinear optical fiber and the second pump light source and configured to tune the wavelength of the first laser light, and the third laser light source may further include a second wavelength tunable filter provided between the second nonlinear optical fiber and the third pump light source and configured to tune the wavelength of the first laser light.

A two-photon microscope according to an example of the inventive concept may include: a first laser light source configured to generate first laser light; a second laser light source configured to generate second laser light having a longer wavelength than a wavelength of the first laser light and including a first nonlinear optical fiber configured to wavelength disperse the first laser light; a third laser light source configured to generate third laser light having a shorter wavelength than the wavelength of the second laser light and including a second nonlinear optical fiber configured to wavelength disperse the first laser light; an objective lens configured to provide the first to third laser light to a sample; a sensor configured to detect first to third fluorescent light generated in the sample due to the first to third laser light; a filter provided between the sensor and the objective lens and configured to remove the first to third laser light; and first to third code controllers provided between the first to third laser light sources and the objective lens and configured to switch the first to third laser light respectively using an orthogonal code method.

According to an example, the first nonlinear optical fiber may include: first cladding; and a first core provided in the first cladding and having a first diameter.

According to an example, the second nonlinear optical fiber may include: second cladding that is the same as the first cladding; and a second core provided in the second cladding and having a second diameter smaller than the first diameter.

According to an example, the second laser light source may further include a first wavelength tunable filter provided adjacent to the first nonlinear optical fiber and configured to tune the wavelength of the second laser light.

According to an example, the third laser light source may further include a second wavelength tunable filter provided adjacent to the second nonlinear optical fiber and configured to tune the wavelength of the third laser light.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
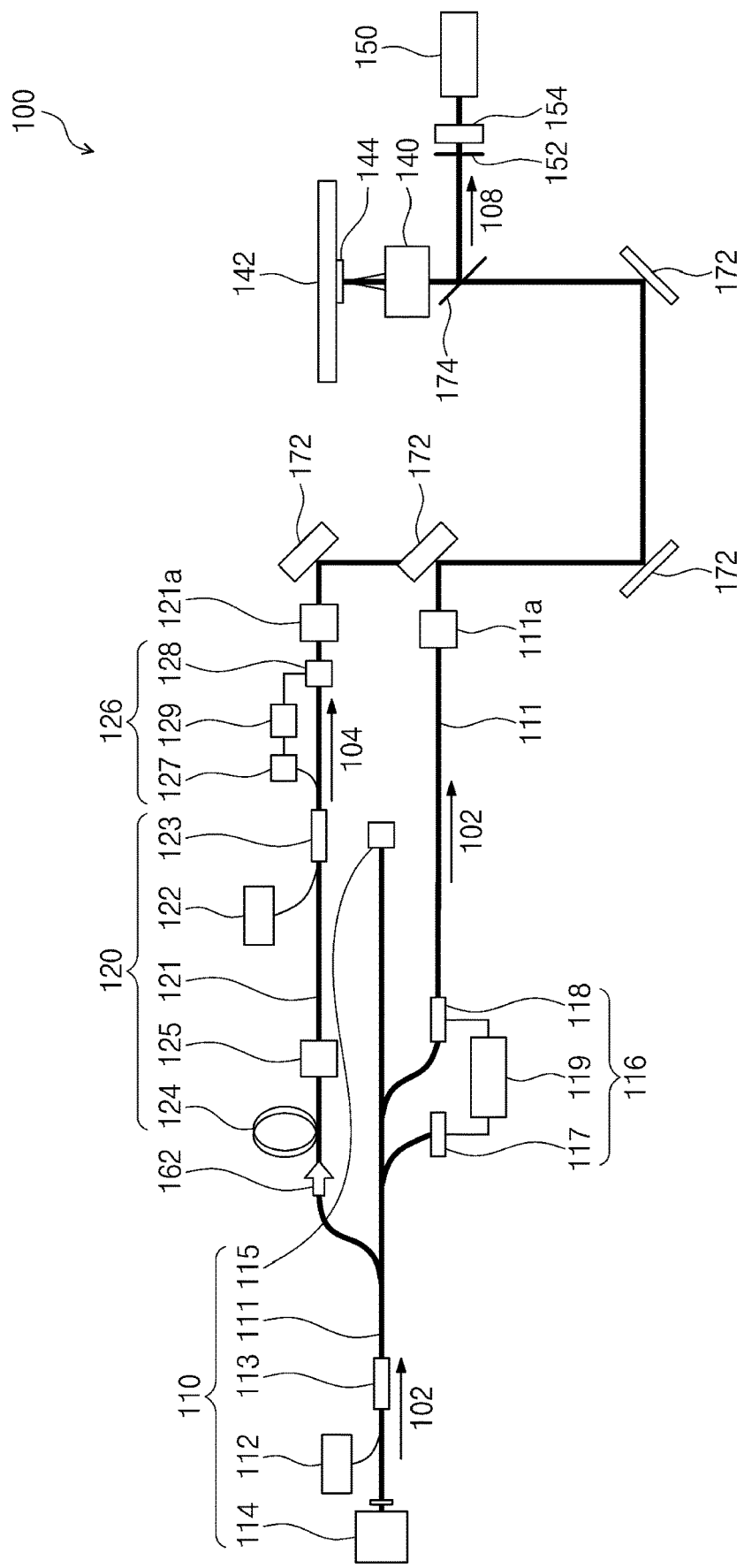
FIG. 1 is a diagram illustrating an example of a two-photon microscope according to the inventive concept.

Embodiments of the inventive concept will now be described in detail with reference to the accompanying drawings. The advantages and features of embodiments of the inventive concept, and methods for achieving the advantages and features will be apparent from the embodiments described in detail below with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout.

The terminology used herein is not for delimiting the embodiments of the inventive concept but for describing the embodiments of the inventive concept. The terms of a singular form may include plural forms unless otherwise specified. It will be further understood that the terms "includes", "including", "comprises", and/or "comprising", when used in this description, specify the presence of stated elements, steps, operations, and/or components, but do not preclude the presence or addition of one or more other elements, steps, operations, and/or components. Furthermore, in the present disclosure, the terms "laser", "code", and "two-photon" may be understood as optical, bio, and medical terms. Reference numerals, which are presented in the order of description, are provided according to the embodiments and are thus not necessarily limited to the order.

FIG. 1 illustrates an example of a two-photon microscope 100 according to the inventive concept.

Referring to FIG. 1, the two-photon microscope 100 of the inventive concept may include a first laser light source 110, a first code controller 116, a second laser light source 120, a second code controller 126, an objective lens 140, and a sensor 150.

The first laser light source 110 may be a reference laser light source. The first laser light source 110 may generate first laser light 102. The first laser light 102 may be reference light. According to an example, the first laser light source 110 may include a first optical fiber 111, a first pump light source 112, a first optical coupler 113, a volume Bragg grating 114, a semiconductor saturable absorber mirror 115.

The first optical fiber 111 may extend in one direction. The first optical fiber 111 may include a single-mode fiber. The first optical fiber 111 may include an erbium doped fiber. Alternatively, the first optical fiber 111 may include a multi-mode optical fiber and an optical fiber having a core doped with a different gain medium. However, an embodiment of the inventive concept is not limited thereto.

The first pump light source 112 may provide first pump light to the first optical fiber 111 so as to obtain a gain of the first laser light 102. The first pump light source 112 may include a laser diode. The first pump light may have a wavelength of about 976 nm.

The first optical coupler 113 may be connected to the first optical fiber 111. The first optical coupler 113 may connect the first pump light source 112 to the first optical fiber 111.

The volume Bragg grating 114, which is a dispersion control element, may be provided on one side end of the first optical fiber 111. The volume Bragg grating 114 may control a spectrum of the first laser light 102 and may adjust a dispersion value of the first laser light 102. A lens may be provided between the volume Bragg grating 114 and the first optical fiber 111. The lens may collimate the first laser light 102 on the volume Bragg grating 114. Instead of the volume Bragg grating 114, a chirped fiber Bragg grating (CFBG)-based optical fiber element may be used, and an optical fiber having a large dispersion value may also be used.

The semiconductor saturable absorber mirror 115 may be connected to the other side of the first optical fiber 111. The semiconductor saturable absorber mirror 115 may reflect and/or resonate the first laser light 102. The semiconductor saturable absorber mirror 115 may pulse the first laser light 102. The first laser light 102 may be femto-second laser light generated by the semiconductor saturable absorber mirror 115.

The first code controller 116 may be connected between the semiconductor saturable absorber mirror 115 and the first optical fiber 111. The first code controller 116 may switch the first laser light 102. According to an example, the first code controller 116 may include a first photodiode 117, a first code generator 119, and a first pulse picker 118. The first photodiode 117 may be connected to the first optical fiber 111. The first photodiode 117 may detect a repetition rate of the first laser light 102. The first pulse picker 118 may be provided adjacent to the first photodiode 117. The first pulse picker 118 may be connected to the first optical fiber 111 between the first optical coupler 113 and a first output terminal 111a. The first code generator 119 may be connected between the first photodiode 117 and the first pulse picker 118. The first code generator 119 may generate an on/off code signal for the first laser light 102. The first pulse picker 118 may perform on/off switching at the time when the first laser light 102 is output, in response to the on/off code signal in synchronization with the repetition rate of the first laser light 102.

The second laser light source 120 may be connected to the first laser light source 110. The second laser light source 120 may receive the first laser light 102 and generate second laser light 104. The second laser light 104 may have a longer wavelength than a wavelength of the first laser light 102. According to an example, the second laser light source 120 may include a second optical fiber 121, a second pump light source 122, a second optical coupler 123, a first nonlinear optical fiber 124, and a first wavelength tunable filter 125.

The second optical fiber 121 may be branched from the first optical fiber 111.

The second pump light source 122 may be connected to the second optical fiber 121. The second pump light source 122 may provide second pump light in the second optical fiber 121 in a reverse direction so as to obtain a gain of the second laser light 104. The second pump light may have a wavelength of about 980 nm.

The second optical coupler 123 may be connected to the second optical fiber 121. The second optical coupler 123 may connect the second pump light source 122 to the second optical fiber 121.

The first nonlinear optical fiber 124 may be connected to the second optical fiber 121 between the first optical fiber 111 and the second optical coupler 123. The first nonlinear optical fiber 124 may wavelength disperse the first laser light 102 and generate the second laser light 104. The second laser light 104 may have a longer wavelength than a wavelength of the first laser light 102.

An isolator 162 may be provided between the first nonlinear optical fiber 124 and the first optical fiber 111. The isolator 162 may prevent the second laser light 104 from being provided to the first optical fiber 111. Although FIG. 1 illustrates that a portion of a first light source is directly incident into the first nonlinear optical fiber 124 through the isolator 162, the portion of the first light source may be made incident after significantly amplifying intensity of the first light source.

The first wavelength tunable filter 125 may be connected between the first nonlinear optical fiber 124 and the second optical coupler 123. The first wavelength tunable filter 125 may tune and/or adjust the wavelength of the second laser light 104.

The second code controller 126 may be connected between the second optical coupler 123 and a second output terminal 121a. The second code controller 126 may switch the second laser light 104. According to an example, the second code controller 126 may include a second photodiode 127, a second code generator 129, and a second pulse picker 128.

The second photodiode 127 may be connected to the second optical fiber 121. The second photodiode 127 may detect a pulse repetition rate of the second laser light 104. The second code generator 129 may be provided adjacent to the second photodiode 127. The second pulse picker 128 may be connected to the second optical fiber 121 between the second optical coupler 123 and the second output terminal 121a. The second code generator 129 may be connected between the second photodiode 127 and the second pulse picker 128. The second code generator 129 may generate an on/off code signal for the second laser light 104. The second pulse picker 128 may perform on/off switching in synchronization with the repetition rate at the time when the second laser light 104 is output, in response to the on/off code signal of the second code generator 129.

The first laser light 102 and the second laser light 104 may be provided to the objective lens 140 through dichroic mirrors 172 and 174. The dichroic mirror 174 may transmit the first laser light 102 and the second laser light 104 and may reflect a wave of fluorescent light 108 to the sensor 150.

The objective lens 140 may be provided to a sample 144 on a stage 142. The objective lens 140 may provide the first laser light 102 and the second laser light 104 to the sample 144 on the stage 142. The sample 144 may emit fluorescent light 108 due to the first laser light 102 and the second laser light 104. The sample 144 may include a biomaterial and a fluorescent material on the biomaterial.

The sensor 150 may be provided adjacent to the dichroic mirror 174. The sensor 150 may detect the fluorescent light 108. According to an example, the sensor 150 may be a two-photon sensor. For example, the sensor 150 may include a photodiode or an image sensor of a CCD and CMOS.

A first filter 152 and a second filter 154 may be provided between the objective lens 140 and the sensor 150. The first filter 152 may protect the sensor 150 by removing the first laser light 102 and the second laser light 104. The second filter 154 is provided so as to branch the fluorescent light 108 and show an image in which the fluorescent light 108 is branched.

Figures 2, 3:
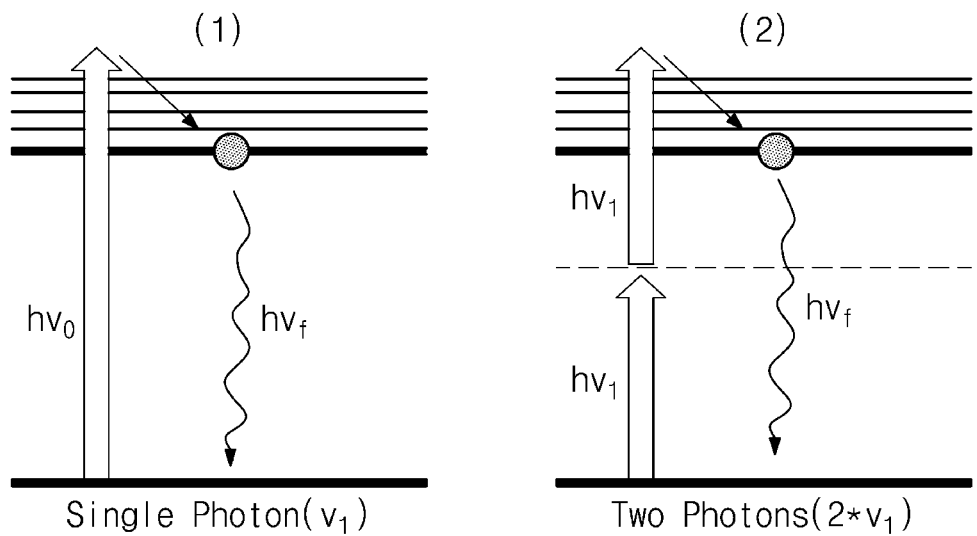
FIG. 2 illustrates mechanisms of single-photon and two-photon microscopes.
FIG. 3 is a chart illustrating an example of an orthogonal code method of the first and second code controllers of FIG. 1 and a third code controller.

FIG. 2 illustrates a generation mechanism of the fluorescent light 108 of FIG. 1. The generation mechanism of the fluorescent light 108 of FIG. 1 may correspond to (2) of FIG. 2.

Referring to FIG. 2, in the case of typical single-photon absorption (1), an electron is excited with first energy hv0 that is at least an absorption band, and the fluorescent light 108 may be generated while the electron loses energy. The two-photon absorption (2) of the inventive concept may be nonlinear absorption. The two-photon absorption (2) may include sequential and/or gradual absorption of second energy hv1, that is lower than the absorption band, in an electron. The electron may be excited to a metastable level by as much as energy of photons of the first laser light 102 or the second laser light 104. The electron within the metastable level may be excited to the absorption band by absorbing the first laser light 102 or the second laser light 104. The electron may generate the fluorescent light 108 while returning back from the unstable absorption band to a ground state. Since the two-photon absorption (2) uses the wavelength of the first laser light 102 or the second laser light 104, which is longer than the absorption band, the sample 144 may be measured deep, and resolution of the two-photon microscope 100 may be increased.

FIG. 3 illustrates an example of an orthogonal code method of the first code controller 116 and the second code controller 126.

Referring to FIG. 3, the first code controller 116 and the second code controller 126 may control the first laser light 102 and the second laser light 104 using the orthogonal code method. In the orthogonal code, the number of 1 (turn on signal) and the number of 0 (turn off signal) are the same. A total length of code configured with 1 and 0 may be appropriately adjusted according to the repetition rates of the first laser light 102 and the second laser light 104 and performance of the sensor 150. A duration of the code of 1 and 0 may be determined by the repetition rates of the first laser light 102 and the second laser light 104. The length of the code of 1 and 0 may be set to 16 bits, and an inner product between codes of 1 and 0 may be 0. When −1 and 1 are respectively allocated to 1 and 0 and an inner product is performed therebetween, <−1>*1+1*<−1>+1*<−1>+<−1>*1+1*<−1>+<−1>*1+<−1>*1+1*<−1>+1*1+<−1>*<−1>+<−1>*<−1>+1*1+<−1>*<−1>+1*1+1*1+<−1>*<−1>=0. The same result is achieved when 1 is allocated to 1 and −1 is allocated to 0. Since 0 is achieved when an inner product is performed between other codes in the same manner, the codes may be orthogonal to each other.

Figure 4:
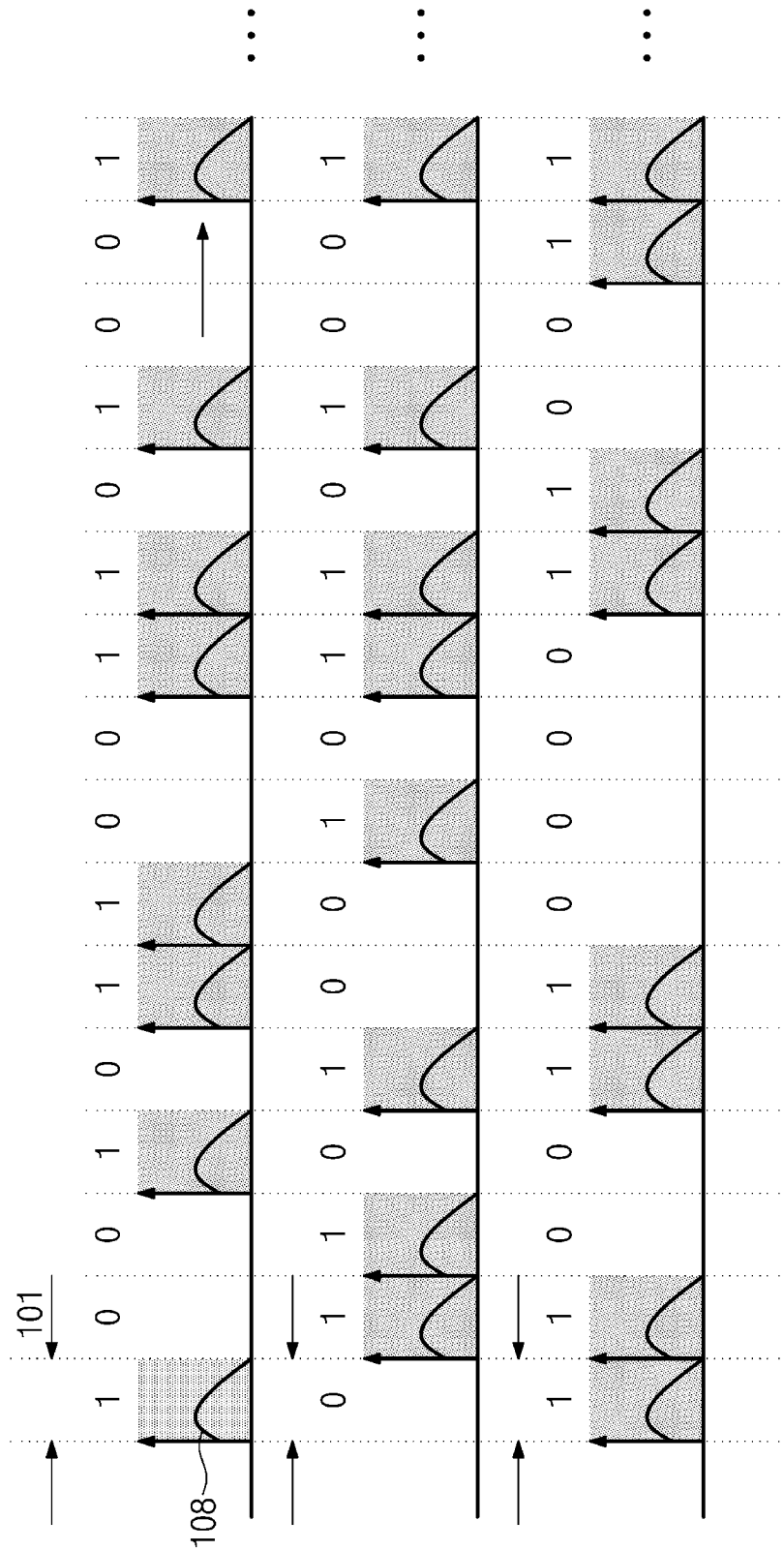
FIG. 4 is a chart illustrating an example of fluorescent light in a time domain of the first and second laser light of FIG. 1 and third laser light.

FIG. 4 illustrates an example of the fluorescent light 108 in a time domain 101 of the first laser light 102 and the second laser light 104 of FIG. 1.

Referring to FIG. 4, the fluorescent light 108 may be individually generated in synchronization with the code in the time domain 101 of the first laser light 102 and the second laser light 104. An exhibition time of the fluorescent light 108 may be about a few nanoseconds or about dozens of nanoseconds. A signal of the fluorescent light 108 may be represented by an orthogonal code in the same manner as the code of the first laser light 102 and the second laser light 104.

Received fluorescent light 108 is measured by the sensor 150 as a sum of orthogonal codes configured with a fluorescent signal. When an inner product is performed on each orthogonal code (1 for signal of 1, −1 for signal of 0) in the received fluorescent light 108, a fluorescence value generated by laser corresponding to each code may be separated and simultaneously obtained. A coding gain may be obtained through an inner product, and interference and noise between the fluorescent light 108 may be minimized.

Therefore, the two-photon microscope 100 of the inventive concept may obtain a coding gain of the fluorescent light 108 while reducing interference and noise between the fluorescent light 108 by using the orthogonal code method.

Figure 5:
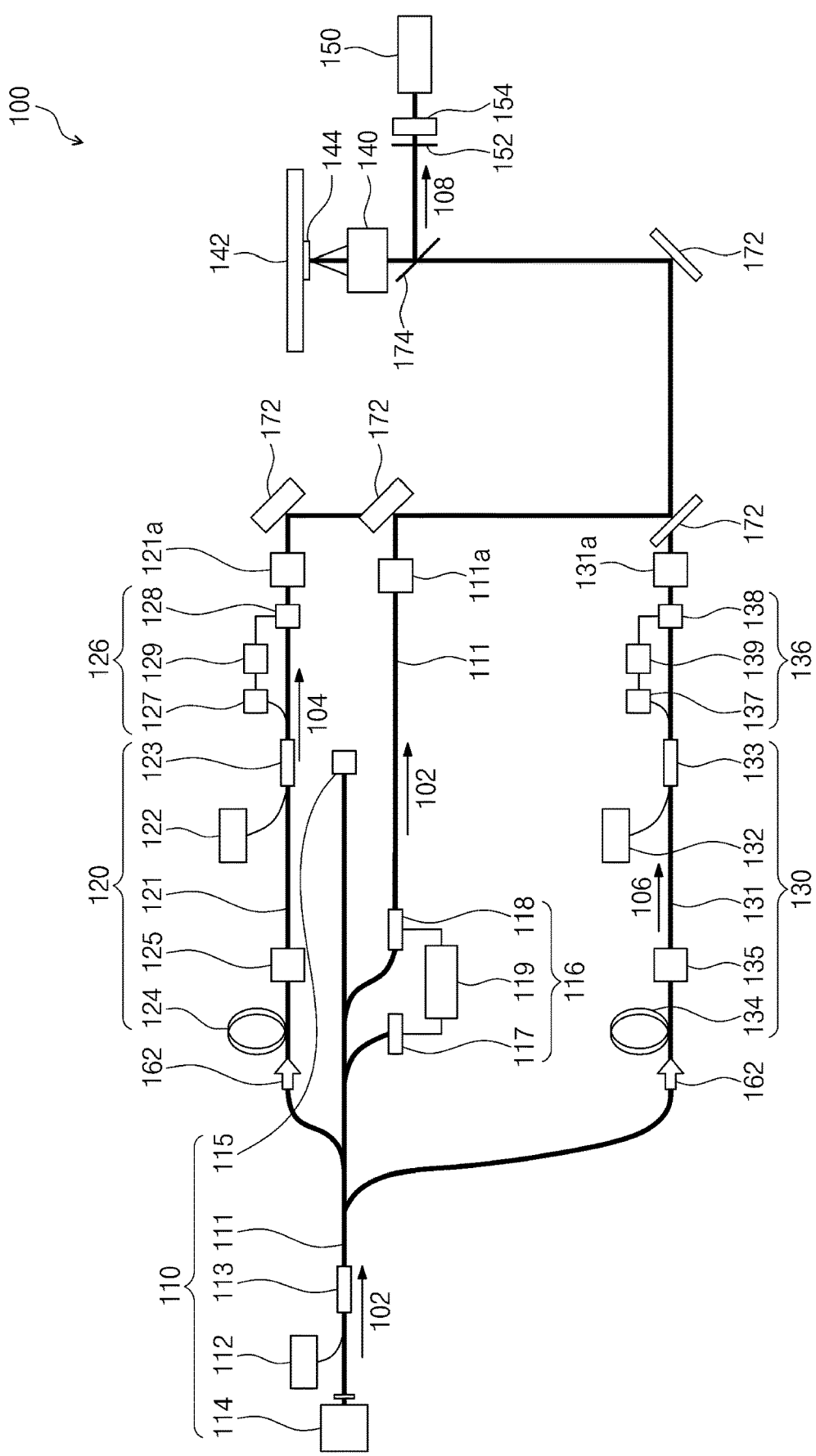
FIG. 5 is a diagram illustrating an example of a two-photon microscope according to the inventive concept.

FIG. 5 illustrates an example of the two-photon microscope 100 according to the inventive concept.

Referring to FIG. 5, the two-photon microscope 100 of the inventive concept may further include a third laser light source 130 and a third code controller 136. The first laser light source 110, the second laser light source 120, the objective lens 140, and the sensor 150 may be configured in the same manner as illustrated in FIG. 1.

The third laser light source 130 may be connected to the first optical fiber 111 of the first laser light source 110. The third laser light source 130 may generate third laser light 106. The third laser light 106 may have a shorter wavelength than the wavelengths of the first laser light 102 and the second laser light 104. According to an example, the third laser light source 130 may include a third optical fiber 131, a third pump light source 132, a third optical coupler 133, a second nonlinear optical fiber 134, and a second wavelength tunable filter 135.

The third optical fiber 131 may be connected to the first optical fiber 111. The third optical fiber 131 may be branched from the first optical fiber 111 and may be connected to a third output terminal 131a. The third optical fiber 131 may include a single-mode fiber. The third optical fiber 131 may include an optical fiber having a core doped with a gain medium.

The third pump light source 132 may be connected to the third optical fiber 131. The third pump light source 132 may provide third pump light in the third optical fiber 131 in a reverse direction so as to obtain a gain of the third laser light 106.

The third optical coupler 133 may be connected to the third optical fiber 131. The third optical coupler 133 may connect the third pump light source 132 to the third optical fiber 131.

The second nonlinear optical fiber 134 may be connected to the third optical fiber 131 between the first optical fiber 111 and the third optical coupler 133. The second nonlinear optical fiber 134 may wavelength disperse the first laser light 102 and generate the third laser light 106. The wavelength of the third laser light 106 may be shorter than the wavelength of the first laser light 102 due to the second nonlinear optical fiber 134. That is, the third laser light 106 may have a shorter wavelength than the wavelength of the first laser light 102.

The isolator 162 may be provided between the second nonlinear optical fiber 134 and the first optical fiber 111. The isolator 162 may prevent the third laser light 106 from being provided to the first optical fiber 111.

The second wavelength tunable filter 135 may be provided between the second nonlinear optical fiber 134 and the third optical coupler 133. The second wavelength tunable filter 135 may tune and/or adjust the wavelength of the third laser light 106.

The third code controller 136 may be provided between the third optical coupler 133 and the third output terminal 131a. The third code controller 136 may switch the third laser light 106. According to an example, the third code controller 136 may include a third photodiode 137, a third code generator 139, and a third pulse picker 138.

The third photodiode 137 may be connected to the third optical fiber 131. The third photodiode 137 may detect a repetition rate of the third laser light 106. The third code generator 139 may be provided adjacent to the third photodiode 137. The third pulse picker 138 may be connected to the third optical fiber 131 between the third optical coupler 133 and the third output terminal 131a. The third code generator 139 may be connected between the third photodiode 137 and the third pulse picker 138. The third code generator 139 may generate an on/off code signal for the third laser light 106. The third pulse picker 138 may perform on/off switching in synchronization with the repetition rate at the time when the third laser light 106 is output, in response to the on/off code signal of the third code generator 139.

Figure 6:
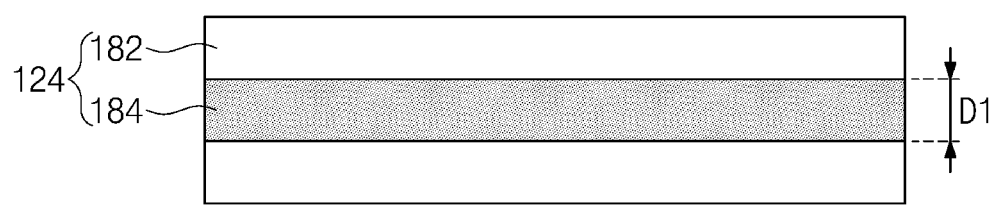
FIG. 6 shows cross-sectional views illustrating examples of the first nonlinear optical fiber and the second nonlinear optical fiber of FIG. 5.
Figure 6:
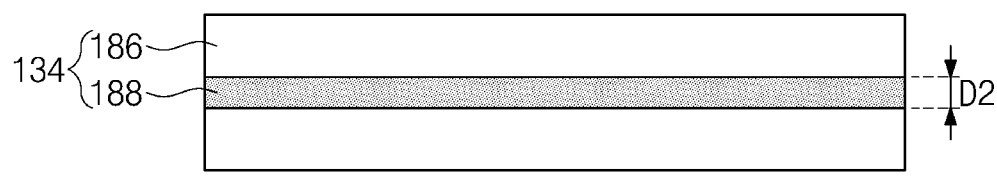

FIG. 6 illustrates examples of the first nonlinear optical fiber 124 and the second nonlinear optical fiber 134 of FIG. 5.

Referring to FIG. 6, a first core 184 of the first nonlinear optical fiber 124 may have a first diameter D1 that is larger than a second diameter D2 of a second core 188 of the second nonlinear optical fiber 134. The first nonlinear optical fiber 124 may generate the second laser light 104 by increasing the wavelength of the first laser light 102 using the first core 184 of the first diameter D1. The second nonlinear optical fiber 134 may generate the third laser light 106 by reducing the wavelength of the first laser light 102 using the second core 188 of the second diameter D2. First cladding 182 of the first nonlinear optical fiber 124 may have the same diameter as that of second cladding 186 of the second nonlinear optical fiber 134.

As described above, the two-photon microscope according to an embodiment of the inventive concept may reduce noise of fluorescent light using first and second code controllers and a third code controller, which switch first and second laser light and third laser light using an orthogonal code method.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A two-photon microscope comprising:
a first laser light source configured to generate first laser light;
a second laser light source connected to the first laser light source and configured to generate second laser light having a longer wavelength than a wavelength of the first laser light;
an objective lens configured to provide the first laser light and the second laser light to a sample;
a sensor configured to detect first fluorescent light and second fluorescent light generated in the sample due to the first laser light and the second laser light; and
first and second code controllers provided between the first and second laser light sources and the objective lens and configured to switch the first laser light and the second laser light respectively using an orthogonal code method,
wherein the first laser light source comprises:
a first optical fiber;
a semiconductor saturable absorber mirror connected to one side of the first optical fiber;
a volume Bragg grating provided to another side of the first optical fiber; and
a first pump light source connected to the first optical fiber between the volume Bragg grating and the semiconductor saturable absorber mirror, the first pump light source configured to provide first pump light in the first optical fiber.

2. The two-photon microscope of claim 1, wherein the first fluorescent light and the second fluorescent light are simultaneously separated using the orthogonal code method.

3. The two-photon microscope of claim 1, wherein the second laser light source comprises:
a second optical fiber branched from the first optical fiber; and
a second pump light source configured to provide second pump light in the second optical fiber to generate the second laser light.

4. The two-photon microscope of claim 3, wherein the second laser light source further comprises:
a first nonlinear optical fiber connected to the second optical fiber and configured to disperse the first laser light; and
a first wavelength tunable filter configured to tune the wavelength of the first laser light.

5. The two-photon microscope of claim 3, further comprising a third laser light source connected to the first laser light source and configured to generate third laser light having a shorter wavelength than the wavelength of the first laser light.

6. The two-photon microscope of claim 5, wherein the third laser light source comprises:
a third optical fiber branched from the first optical fiber; and
a third pump light source configured to provide third pump light in the third optical fiber to generate the third laser light.

7. The two-photon microscope of claim 6, wherein the third laser light source further comprises:
a second nonlinear optical fiber connected to the third optical fiber and configured to disperse the first laser light; and
a second wavelength tunable filter configured to tune the wavelength of the first laser light.

8. The two-photon microscope of claim 7, wherein:
the first nonlinear optical fiber comprises a first core having a first diameter, and
the second nonlinear optical fiber comprises a second core having a second diameter smaller than the first diameter.

9. The two-photon microscope of claim 1, further comprising a filter provided between the sensor and the objective lens and configured to remove the first laser light and the second laser light.

10. A two-photon microscope comprising:
a first laser light source configured to generate first laser light using first pump light;
a second laser light source configured to generate second laser light having a longer wavelength than a wavelength of the first laser light using second pump light having a longer wavelength than a wavelength of the first pump light;
a third laser light source configured to generate third laser light having a shorter wavelength than the wavelength of the first laser light using third pump light having a shorter wavelength than the wavelength of the first pump light;

an objective lens configured to provide the first to third laser light to a sample;

a sensor configured to detect first to third fluorescent light generated in the sample due to the first to third laser light;

a filter provided between the sensor and the objective lens and configured to remove the first to third laser light; and first to third code controllers provided between the first to third laser light sources and the objective lens and configured to switch the first to third laser light respectively using an orthogonal code method, wherein the first laser light source comprises:

a first optical fiber;

a semiconductor saturable absorber mirror provided to one side of the first optical fiber;

a volume Bragg grating provided to another side of the first optical fiber; and a first pump light source connected to the first optical fiber between the volume Bragg grating and the semiconductor saturable absorber mirror and configured to provide the first pump light in the first optical fiber.

11. The two-photon microscope of claim 10, wherein the second laser light source comprises:

a second optical fiber branched from the first optical fiber;

a second pump light source configured to provide the second pump light in the second optical fiber; and a first nonlinear optical fiber connected to the second optical fiber and configured to disperse the first laser light.

12. The two-photon microscope of claim 11, wherein the third laser light source comprises:

a third optical fiber branched from the first optical fiber;

a third pump light source configured to provide the third pump light in the third optical fiber; and a second nonlinear optical fiber connected to the third optical fiber and configured to disperse the first laser light.

13. The two-photon microscope of claim 12, wherein:

the second laser light source further comprises a first wavelength tunable filter provided between the first nonlinear optical fiber and the second pump light source and configured to tune the wavelength of the first laser light, and the third laser light source further comprises a second wavelength tunable filter provided between the second nonlinear optical fiber and the third pump light source and configured to tune the wavelength of the first laser light.

14. A two-photon microscope comprising:

a first laser light source configured to generate first laser light;

a second laser light source configured to generate second laser light having a longer wavelength than a wavelength of the first laser light, the second laser light source comprising a first nonlinear optical fiber configured to disperse the first laser light;

a third laser light source configured to generate third laser light having a shorter wavelength than the wavelength of the second laser light, the third laser light source comprising a second nonlinear optical fiber configured to disperse the first laser light;

an objective lens configured to provide the first to third laser light to a sample;

a sensor configured to detect first to third fluorescent light generated in the sample due to the first to third laser light;

a filter provided between the sensor and the objective lens and configured to remove the first to third laser light; and first to third code controllers provided between the first to third laser light sources and the objective lens and configured to switch the first to third laser light respectively using an orthogonal code method.

15. The two-photon microscope of claim 14, wherein the first nonlinear optical fiber comprises:

first cladding; and a first core provided in the first, the first core having a first diameter.

16. The two-photon microscope of claim 15, wherein the second nonlinear optical fiber comprises:

second cladding that is the same as the first cladding; and a second core provided in the second cladding, the second core having a second diameter smaller than the first diameter.

17. The two-photon microscope of claim 14, wherein the second laser light source further comprises a first wavelength tunable filter provided adjacent to the first nonlinear optical fiber and configured to tune the wavelength of the first laser light.

18. The two-photon microscope of claim 14, wherein the third laser light source further comprises a second wavelength tunable filter provided adjacent to the second nonlinear optical fiber and configured to tune the wavelength of the first laser light.

* * * * *